(12) United States Patent
Brassard et al.

(10) Patent No.: US 10,551,610 B2
(45) Date of Patent: Feb. 4, 2020

(54) ALIGNMENT AND ROTATION OF JANUS MICROPARTICLES IN RESPONSE TO ACCELERATION

(71) Applicants: NATIONAL RESEARCH COUNCIL OF CANADA, Ottawa (CA); BANK OF CANADA, Ottawa (CA)

(72) Inventors: Daniel Brassard, Longueuil (CA); Lidija Malic, Montreal (CA); Keith J. Morton, St-Bruno-de-Montarville (CA); Teodor Veres, Montreal (CA); Charles D. Macpherson, Santa Barbara, CA (US); Theodoros Garanzotis, Ottawa (CA)

(73) Assignees: National Research Council of Canada, Ottawa (CA); Bank of Canada, Ottawa (CA)

( * ) Notice: Subject to any disclaimer, the term of this patent is extended or adjusted under 35 U.S.C. 154(b) by 235 days.

(21) Appl. No.: 15/539,508

(22) PCT Filed: Dec. 23, 2015

(86) PCT No.: PCT/IB2015/059971
§ 371 (c)(1),
(2) Date: Nov. 15, 2017

(87) PCT Pub. No.: WO2016/103226
PCT Pub. Date: Jun. 30, 2016

(65) Prior Publication Data
US 2017/0371151 A1    Dec. 28, 2017

Related U.S. Application Data

(60) Provisional application No. 62/096,700, filed on Dec. 24, 2014, provisional application No. 62/096,695, filed on Dec. 24, 2014.

(51) Int. Cl.
*G02B 26/00* (2006.01)
*G02B 26/08* (2006.01)
(Continued)

(52) U.S. Cl.
CPC ......... *G02B 26/026* (2013.01); *B42D 25/29* (2014.10); *B42D 25/36* (2014.10); *B42D 25/405* (2014.10);
(Continued)

(58) Field of Classification Search
CPC ........ G02F 1/167; G02F 1/0128; G02F 1/172; G02F 2201/38; G02F 1/133553;
(Continued)

(56) References Cited

U.S. PATENT DOCUMENTS

| 4,126,854 A | 11/1978 | Sheridon |
| 5,389,945 A | 2/1995 | Sheridon |

(Continued)

FOREIGN PATENT DOCUMENTS

| CA | 2714639 A1 | 0/0000 |
| CN | 10197778 A | 2/2011 |

(Continued)

OTHER PUBLICATIONS

Jianzhong, Lin et al—"Effects of the aspect ratio on the sedimentation of a fiber in Newtonian fluids"; Journal of Aerosol Science; 34 (2003) pp. 909-921.
(Continued)

*Primary Examiner* — Brandi N Thomas
(74) *Attorney, Agent, or Firm* — Aventum IP Law LLP

(57) ABSTRACT

Gravitational Janus microparticle having, a center-of-mass, a center-of-volume, and a non-uniform density, wherein: the center-of-mass and the center-of-volume are distinct. When suspended in a fluid, the microparticle substantially aligns with either: i) the gravitational field; or ii) the direc-
(Continued)

tion of an acceleration, such that the Janus microparticle is in substantial rotation equilibrium. After perturbation from substantial rotational equilibrium, the Janus microparticle reversibly rotates to return to substantial rotational equilibrium. The gravitational Janus microparticle may comprise at least two portions, each having distinct physical and/or chemical characteristics, wherein at least one portion provides a detectable effect following rotation and alignment of the microparticle.

23 Claims, 8 Drawing Sheets

(51) Int. Cl.
*G02F 1/29* (2006.01)
*G02B 26/02* (2006.01)
*G02B 1/00* (2006.01)
*B42D 25/405* (2014.01)
*B42D 25/29* (2014.01)
*B82B 1/00* (2006.01)
*B42D 25/36* (2014.01)
*G02F 1/01* (2006.01)
*G06Q 30/00* (2012.01)
*G02F 1/167* (2019.01)
*G02F 1/17* (2019.01)

(52) U.S. Cl.
CPC .............. *B82B 1/003* (2013.01); *G02B 1/005* (2013.01); *G02F 1/0128* (2013.01); *G06Q 30/0185* (2013.01); *G02B 2207/101* (2013.01); *G02F 1/167* (2013.01); *G02F 1/172* (2013.01); *G02F 2201/38* (2013.01)

(58) Field of Classification Search
CPC ........ G02F 2001/133616; G02B 1/005; G02B 2207/101; G02B 26/026; G02B 6/005; G02B 6/0051
USPC ........................ 359/290–292, 295, 296, 298
See application file for complete search history.

(56) References Cited

U.S. PATENT DOCUMENTS

| 5,808,783 | A | 9/1998 | Crowley |
| 6,197,228 | B1 | 3/2001 | Sheridon |
| 6,445,490 | B1 | 9/2002 | Chopra et al. |
| 6,659,351 | B1 | 12/2003 | Bailleu et al. |
| 6,980,352 | B1 | 12/2005 | Tam |
| 8,068,271 | B2 | 11/2011 | Lipovetskaya et al. |
| 8,614,136 | B1* | 12/2013 | Cao .............. H01L 49/00 257/14 |
| 2008/0063970 | A1* | 3/2008 | Kikawa .............. G03G 9/09307 430/110.2 |
| 2013/0017948 | A1 | 1/2013 | Charlson et al. |
| 2015/0151562 | A1 | 6/2015 | Whiteman et al. |

FOREIGN PATENT DOCUMENTS

| WO | 2013013807 A1 | 1/2013 |
| WO | 2015144511 A1 | 10/2015 |

OTHER PUBLICATIONS

Sheridon, N.K., et al—"The Gyricon rotating ball display"; Journal of the SID 7/2, 1999—pp. 141-144.
Wang, Lian-Ping et al—"Settling velocity and concentration distribution of heavy particles in homogeneous isotropic turbulence"; J. Fluid Mech. 1993), vol. 256, pp. 27-68.
Campbell, Andrew I. et al—"Gravitaxis in Spherical Janus Swimming Devices"; ACS Publicatons, Longmuir 2013, 29 pp. 14066-14073.
Guazzelli, Elisabeth et al—"Fluctuations and Instability in Sedimentation"; Annu. Rev. Fluid Mech. 2011, 43: pp. 97-116.
Westerweel, Jerry et al—"Particle Image Velocimetry for Complex and Turbulent Flows"; Annu. Rev. Fluid Mech. 2013, 45: pp. 409-436.
Wolff, Katrin et al—"Sedimentation and polar order of active bottom-heavy particles"; EPJ manuscript No. Dec. 16, 2013—pp. 1-6.
Kreuter, C. et al—"Transport phenomena and dynamics of externally and self-propelled colloids in confined geometry"; The European Physical Journal Special Topics; 222 (2013) pp. 2923-2939.
Palacci, Jeremie et al—"Sedimentation and Effective Temperature of Active Colloidal Suspensions"; The American Physical Society; Aug. 20, 2010—pp. PRL 088304-1 to PRL 088304-4.
Shia-Yen, Teh et al—"Droplet microfluidics", Lab on a Chip, GB, vol. 8, No. 2, Jan. 1, 2008 (Jan. 1, 2008), pp. 198-220, XP002619583, ISSN: 1473-0197, DOI: 10.1039/B715524G [retrieved on Jan. 11, 2008].
Honegger et al—"4-D dielectrophoretic handling of Janus particles in a microfluidic chip"; Elsevier—Microelectronic Engineering 87 (2010—pp. 756-759.
Walther, Andreas et al—"Janus Particles: Synthesis, Self-Assembly, Physical Properties, and Applications"—ACS Publications; Chemical Reviews; 2013—pp. 5194-5261.

* cited by examiner

FIG. 2A  FIG. 2B  FIG. 2C

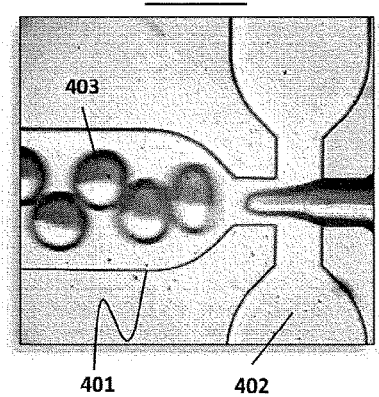
FIG. 4A
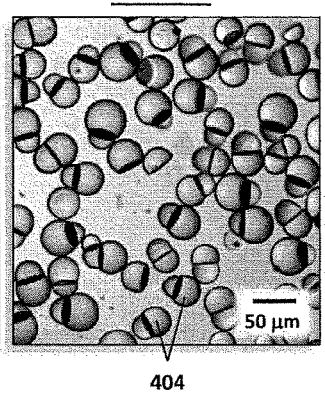
FIG. 4B
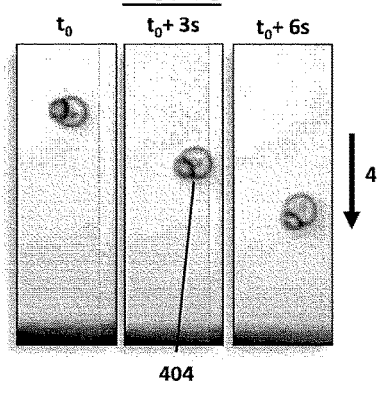
FIG. 4C
FIG. 4

FIG. 6A
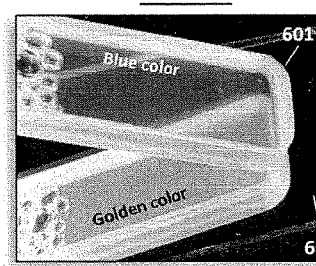
FIG. 6B
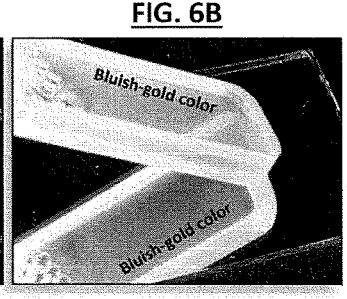
FIG. 6C
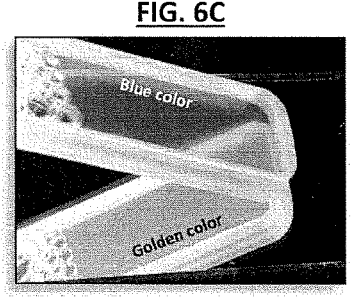
FIG. 6

ALIGNMENT AND ROTATION OF JANUS MICROPARTICLES IN RESPONSE TO ACCELERATION

TECHNICAL FIELD

The present invention relates to the field of Janus microparticles. In particular, it relates to dynamic responses of Janus microparticles in the presence of gravitational and acceleration fields.

Janus particles are microparticles having at least two distinct physical and/or chemical properties, which give rise to unique characteristics related to their asymmetric structure (see, for example A. Walther and A. H. E. Müller, "Janus particles: synthesis, self-assembly, physical properties, and applications.," Chem. Rev., vol. 113, no. 7, pp. 5194-261, July 201). They are studied for their tendency to create self-assembled structures, for e-paper and display technology applications, self-propulsion, probes for optical traps, etc. U.S. Pat. Nos. 4,126,854; 5,389,945; 5,808,783; 6,197,228; 6,445,490; 6,980,352 and 8,068,271 B2 teach how bichromic spherical particles have been used to create active displays by rotation in the presence of an electric or magnetic field.

While rotation and alignment of Janus microparticles has been achieved using various forces, including capillary action, electrostatic forces, viscous drag, electrical and magnetic fields, gravitational forces are considerably lower at this scale. Thus, while the effect of gravitation on the sedimentation of microparticles has been investigated, it is not obvious to design Janus microparticles having the characteristics required to control the rotational speed and eventual alignment induced by gravitational forces alone. For example, the effect of gravitation or acceleration would typically be considered detrimental for displays and e-paper applications as it can deteriorate an image initially created by electrical and/or magnetic forces. Also, as the bichromic balls used for the fabrication of the Gyricon displays are typically made from white and black wax, the average density of such microparticles is fairly uniform, thus limiting the possibility to create rotational effects arising from gravitation and/or acceleration.

I. Campbell and S. J. Ebbens ("Gravitaxis in spherical Janus swimming devices.," Langmuir, vol. 29, no. 46, pp. 14066-73, November 2013) and K. Wolff, A. M. Hahn, and H. Stark, ("Sedimentation and polar order of active bottom-heavy particles," ArXiv ID 1302.7268, February 2013) report preferential gravitational-based alignment of metal-coated Janus particles for "self-propelled" device applications. In these disclosures, self-propelled devices are Janus particles composed of a thin hemispherical platinum metallic coating on the surface of a polymer bead. The Janus particles are then immersed in an aqueous solution containing hydrogen peroxide. The platinum metallic coating triggers an asymmetric catalytic decomposition of hydrogen peroxide to water and oxygen which produces a propulsion force by a nanobubble release mechanism. What is additionally observed is a gravitaxis effect in such Janus self-propelled devices—that is, gravitation can affect the average orientation of the platinum semi-hemispherical cap, which favors propulsion of the particles against the gravitational field. The effects of random rotational Brownian forces and gravitational forces were evaluated, while a Boltzmann statistics model was constructed to predict the angle distribution of the swimming direction. These disclosures demonstrate how a thin metallic layer applied on a spherical particle can trigger a gravitational rotation of the particles. Note however that the model shown by A. I. Campbell and S. J. Ebbens does not predict the speed at which the particles rotate under gravitation (only the angular distribution at equilibrium). While these disclosures envisage different applications exploiting this gravitaxis behavior, all are in the context of swimming devices.

CA 2,714,639 (published Aug. 20, 2009) discloses a security element that comprises a substrate with a multitude of particles. The particles represent at least two distinguishable information states. The security element changes reversibly between the information states under the interaction of a mechanical force and gravity, while the particles remain wholly aligned with gravity, and as such, act like miniature gyroscopes.

SUMMARY

The term "gravitational Janus microparticles" refers to microparticles having the characteristics required to efficiently rotate and align with gravitation or acceleration.

Gravitational Janus microparticles and related compositions in their general forms will first be described, and then their implementation in terms of embodiments will be detailed hereafter. These embodiments are intended to demonstrate the principles of gravitational Janus microparticles and the manner of implementation. Gravitational Janus microparticles and related compositions in their broadest and more specific forms will then be further described, and defined, in each of the individual claims which conclude this specification.

Disclosed herein is the rotation and/or alignment of Janus microparticles by gravitation for the generation of a dynamic macroscopic effect, such as: an effect visible by an unaided human eye; an effect detectable by an instrument, etc. In particular, targeted dynamic effects can be obtained using Janus microparticles having characteristics such that the gravitational field is strong enough to rotate and align the microparticles.

It is disclosed herein, both experimentally and theoretically that for Janus microparticles having appropriate characteristics, rotation and/or alignment of these microparticles induced by normal gravitation can occur within a few seconds in conventional liquids. Additional details regarding (i) the characteristics required for microparticles to rotate and align collectively under a gravitational field; (ii) the various types of gravitational Janus microparticles; (iii) optimization of the macroscopic effect, and (iv) applications are provided.

In one aspect of the present invention, there is provided a Janus microparticle having, a center-of-mass, a center-of-volume, and a non-uniform density, wherein: the center-of-mass and the center-of-volume are distinct; and when suspended in a fluid: the Janus microparticle substantially aligns with either: i) the gravitational field; or ii) the direction of an acceleration, such that the Janus microparticle is in substantial rotation equilibrium; and after perturbation from substantial rotational equilibrium, the Janus microparticle reversibly rotates to return to substantial rotational equilibrium.

In another aspect of the present invention, there is provided a composition comprising: a plurality of Janus particles; and a fluid; wherein each of the Janus particles: a) has a center-of-mass distinct from a center-of-volume; b) substantially aligns with either: i) a gravitational field; or ii) the direction of an acceleration, such that the Janus microparticles are in substantial rotation equilibrium; and c) after perturbation from substantial rotational equilibrium, reversibly rotates and/or substantially realigns to substantial rotational equilibrium.

The perturbation may be caused by an external acceleration or an external force selected from viscous drag, mechanical, electrical, electrostatic, dielectrophoretic, magnetic and any combination thereof. In one embodiment, the external force is viscous drag. In addition, the perturbation may be caused by movement of the fluid, for example, by rotation or non-uniform flow of the fluid.

As a result of the perturbation, the Janus microparticle can rotate with a maximum rotational velocity between 5 deg/s and 400 deg/s when exposed to gravitational acceleration of 9.8 m/s$^2$ and the fluid has a viscosity of between 1 cP and 20 cP. Alternatively, the maximum rotational velocity is can be between 50 deg/s and 150 deg/s.

In another feature, the reversible rotation and/or alignment may occur between 0.01 s and 100 s, or between 1 s and 10 s, when the Janus microparticle is exposed to gravitational acceleration of 9.8 m/s$^2$ and the fluid has a viscosity of between 1 cP and 20 cP.

The Janus microparticle may comprise at least two portions, each having distinct physical and/or chemical characteristics, wherein at least one portion provides a detectable effect following rotation and alignment of the microparticle. The distinct physical and/or chemical characteristics provide a macroscopic detectable effect during rotation and following alignment of a plurality of Janus microparticles that can be observed by an unaided human eye, or an effect that is covert or machine readable. The Janus microparticle can have a size of between 0.1 micron and 100 microns.

Interactions of the Janus microparticle with a solid wall are of interest. For example, the Janus microparticle described above, can rotate after sedimentation onto a solid surface. A general example of particle geometry is a Janus microparticle that is axially symmetric or nearly axially symmetric along at least one axis of symmetry and the center-of-mass is located away from the at least one axis of symmetry. Spherical or nearly spherical Janus microparticles can also rotate after sedimentation. Two other general categories of microparticles include: a) a Janus microparticle that has an average density greater than a density of the surrounding fluid; where a part of the Janus microparticle has a density less than the density of the fluid; and b) a Janus microparticle that has an average density less than a density of the surrounding fluid; where at least a part of the Janus microparticle has a density greater than the density of the fluid.

Characteristics of the surrounding fluid can also include a fluid density that is similar to the average density of the Janus microparticle. In addition, the fluid can have a maximum viscosity at room temperature of about 20 centipoise (cP). Examples of such a fluid include aqueous solutions, fluorinated oils, hydrofluoroether, glycol derivatives, ionic liquids, silicone oils, perfluorocarbon fluids, perfluoropolyether fluids, ethylene dibromide, methylene dibromide, sodium polytungstate, methylene iodide, isoparaffinic fluids, and mixtures thereof. In addition, the fluid may include a surfactant, a stabilizer, a dispersion agent, an emulsifier, a charge control agent, an anti-static agent, a dye, a colorant, or a pigment. Non-exhaustive examples of surfactants include poloxamer, polysorbate detergent, sodium dodecyl sulfate, sorbitan oleate, perfluoropolyether lubricant and any combination thereof.

Brownian motion may also have an effect on the dynamics of the rotation and/or alignment described above. In some instances, rotational Brownian motion is negligible compared to convection forces due to gravitation; and the rotation and/or alignment occurs at a gravitational acceleration of 9.8 m/s$^2$. In other instances, random rotational Brownian motion may exceed convection forces due to gravitation; and alignment occurs at accelerations greater than a gravitational acceleration of 9.8 m/s$^2$. In either case, rotation and/or alignment can be affected by an external force selected from electrical, electrostatic, dielectrophoretic, magnetic and any combination thereof.

The collective effects of a plurality of rotating/aligning microparticles are also of interest. For example, the surface of each portion of a Janus microparticle can contain distinct colours, contrast variations or fluorescent dyes or any combination thereof. In addition, the surface of the Janus microparticle may contain diffraction gratings or other types of optically-variable coatings. As another example, one portion of the Janus microparticle may be partially transparent, with light refracting through the partially-transparent portion. Furthermore, an anti-reflective or low-reflectivity coating may be added to the surface of one portion. For example, a transparent microparticle can be covered in part with a first layer of colored coating, followed by a second layer of antireflective coating on top of the colored layer. When the Janus microparticle rotates, either the colored coating is visible (through the transparent particle) or the black color of the anti-reflective coating is visible.

A surface of the Janus microparticle can be functionalized in many ways. For example, a surface of at least one portion may be chemically modified. This can include a chemical end-group selected from thiol, carboxyl, amine, hydroxyl, maleimide, and a combination thereof.

Physical characteristics of the Janus microparticle include a number of features. For example, the Janus microparticle may comprise a material with a non-uniform porosity. Or, the Janus microparticle may comprise at least two materials, each material having a different density. An example of the latter is a Janus microparticle that comprises: i) an inner core; and ii) a coating on a surface portion of the Janus particle, wherein the inner core has a density distinct from a density of the coating. The inner core can have a diameter from 0.1 to 100 microns, while the coating can have a thickness of from 10 nm to 500 nm, with the coating thickness being less than 20% of the diameter of the inner core.

In terms of the coating, it may have an anti-reflective component. In general, the anti-reflective component can comprise chromium, gold, titanium, tungsten, silicon dioxide, silicon nitride or any combination thereof. One example of such a coating includes a first layer of chromium on the surface portion of the inner core, a second layer of gold on the first layer; a third layer of chromium on the second layer; a fourth layer of silicon dioxide on the third layer; a fifth layer of chromium on the fourth layer; and a sixth layer of silicon dioxide and the fifth. In addition to the anti-reflective component, the coating may also comprise a thin film, a dye or a colorant or any combination thereof.

The coating can be obtained by deposition on a plurality of self-assembled colloidal crystals. One method includes a physical vapor deposition process. Another possible method includes first activating a surface portion of each of the self-assembled colloidal crystals, followed by immersion in an electroless solution. Whatever the method of deposition, the self-assembled colloidal crystals may be partially etched before deposition of the coating.

An example of a Janus microparticle suspended in a fluid includes a core that comprises polystyrene, polyethylene or silica beads doped with a fluorescent dye or colorant; and a coating that comprises gold and nickel. The Janus microparticle is suspended in water.

It is also possible to have a core that consists of a shell and a hollow interior; the shell can be made from silica.

As described above, when a thin film is deposited onto a core, the Janus microparticle can be fabricated by a template electrodeposition process.

On the other hand, a Janus microparticle having materials with differing densities (but without a thin film) can be fabricated by a microfluidic flow focussing technique. The fabrication process can be based on a batch emulsion polymerization process.

As an example, the microfluidic flow focussing technique can include a flow of mineral oil with a laminar flow of (i) photocurable polyethylene glycol diacrylate (PEGDA) doped with iron-oxide-silica nanoparticles and (ii) photocurable ethoxylated trimethylolpropane triacrylate (ETPTA) for production of a plurality of ETPTA/PEGDA Janus microparticles. The ETPTA/PEGDA Janus microparticles can have distinct densities, colours and magnetic properties. In addition, the ETPTA/PEGDA Janus microparticles usually have a size of about 30 microns.

There are many applications of gravitational Janus microparticles, including use in security or authentication device; use in biomedical applications; use in measurement of acceleration or orientation; and use in characterization of fluid displacement.

The aforementioned macroscopic effects can also be observed using a plurality of gravitational Janus microparticles having different rotational speeds that produce a sequence of multiple macroscopic effects following a perturbation in acceleration.

Wherever ranges of values are referenced within this specification, sub-ranges therein are intended to be included within the scope of the gravitational Janus microparticles, unless otherwise indicated. Where characteristics are attributed to one or another variant of the gravitational Janus microparticles, unless otherwise indicated, such characteristics are intended to apply to all other variants where such characteristics are appropriate or compatible with such other variants.

BRIEF DESCRIPTION OF FIGURES

FIGS. 4A-4C illustrate fabrication and rotation/alignment of a second embodiment of gravitational Janus microparticles.

FIGS. 6A-6C illustrate dynamic macroscopic effects of a fourth embodiment of gravitational Janus microparticles.

DEFINITIONS

Figure 1:
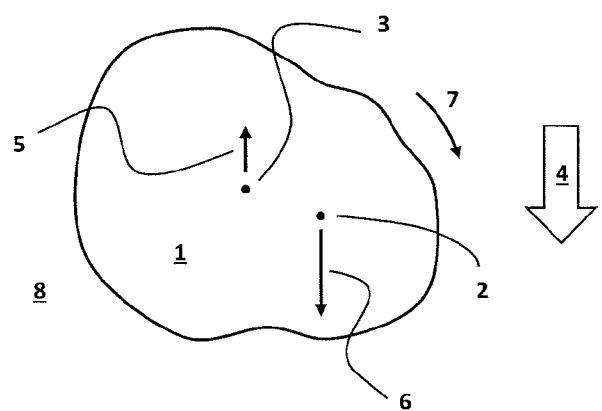
FIG. 1 illustrates the various forces on a gravitational Janus particle suspended in a fluid.

Microparticles: particles having characteristic dimensions in the micrometer range, typically in the range of 0.01-500 microns ($\mu m$). Microparticles can be fabricated from a wide variety of one or more materials including the following non-limiting examples: polymers, metals, ceramics, glass, porous materials, foams, composites, magnetic materials. They can have various shapes, including the following non-limiting examples: sphere, oval, quasi-sphere, disk, cylinder, cubic, prism, pyramid, flakes, or hollow, porous, rough or complex shapes.

Janus microparticles: microparticles having at least two distinct physical and/or chemical properties.

Gravitational Janus microparticle: A Janus microparticle microparticles that has the characteristics required to efficiently rotate and align with gravitation or acceleration. An example of a gravitational Janus microparticle is a Janus microparticle that has a center-of-mass distinct from its center-of-volume, so that it aligns with gravitation or acceleration.

Acceleration: rate at which the velocity of an object changes with time. Acceleration results of the sum of all forces acting on the object according to Newton's Second Law. The term acceleration may refer to any of the items in the following non-limiting list: deceleration, linear acceleration, non-linear acceleration, uniform or constant acceleration, non-uniform acceleration, gravitational acceleration, inertial acceleration, centrifugal acceleration, centripetal acceleration, tangential acceleration, and angular acceleration.

Gravitational acceleration, gravitational acceleration field: the acceleration of an object caused by gravitational force. Gravitational acceleration is a vector quantity and is described by unit of length divided by time squared (e.g. $m/s^2$). On Earth, gravitational acceleration takes a value of approximately 9.8 $m/s^2$.

Fluid: a substance that continuously deforms and flows under the application of shear. Fluids typically refer to a liquid, a gas, a mixture, a solution, a dispersion, a suspension, a colloid, an emulsion, or a gel. Non exhaustive examples of fluids include: aqueous solutions, fluorinated oils, hydrofluoroether, glycol derivatives, ionic liquids, silicone oils, perfluorocarbon fluids, perfluoropolyether fluids, ethylene dibromide, methylene dibromide, sodium polytungstate, methylene iodide, isopar, a ferrofluid, uncured UV resin, and mixtures thereof. In addition, the fluid may include a surfactant, a stabilizer a dispersion agent, an emulsifier, a charge control agent, an anti-static agent, a dye, a colorant, or a pigment. Non-exhaustive examples of surfactants include poloxamer, polysorbate detergent, sodium dodecyl sulfate, sorbitan oleate, perfluoropolyether lubricant and any combination thereof.

Sedimentation: the downward displacement or falling of microparticles in a fluid, in response to a force acting on the microparticles. Sedimentation can refer herein to settling, dropping, or downward motion of the microparticles. The term sedimentation is used herein both (i) for microparticles in suspension in a fluid that settles on a solid surface and (ii) for microparticles that were previously settled on a solid surface before initiating their motion in the fluid.

Flotation: the upward displacement or rising of microparticles in a fluid, in response to a force acting on the microparticles. The term flotation is used herein both (i) for microparticles in suspension in a fluid that rises towards a solid surface, and (ii) for microparticles that were previously settled on a solid surface before initiating their motion in the fluid.

Substantial rotational equilibrium, rotational equilibrium: a stable or quasi-stable state of matter in which one microparticle or a plurality of microparticles reach a steady state of alignment with gravitation or other external acceleration such that, on the average, no detectable or significant convective rotation occurs with time. In this context, it is understood that the system can be considered to be in rotational equilibrium or substantial rotational equilibrium even in the presence of Brownian motion, or negligible forces or if the microparticles are sedimenting, floating or translating.

Dynamic effect or response: a response or effect that elicits at least one detectable change occurring continuously with time. For example, a dynamic response may include a continuous optical change, that may be observable by unaided the human eye.

Detectable effect: a modification or response to a state of matter that can be measured by an appropriate tool or directly perceived by human, typically with aided or unaided human eye.

Macroscopic effect: a collective modification or response generated by combining individual modifications, responses, displacements or rotations of a plurality of microscopic elements. The macroscopic effect can be the result of a plurality of identical, similar, or different microscopic responses occurring at one or more timescales.

Surfactant: a substance that reduces the surface tension of a liquid in which it is dissolved.

Stabilizer: a substance that prevents or retard an unwanted alteration of a physical state when added to a fluid.

Dispersion agent: a substance added to a fluid to improve the separation of microparticles and prevent their adhesion, flocculation, settling or clumping.

Anti-reflective coating: a coating applied on a solid surface to reduce the amount of light reflected by the surface.

Low-reflectivity coating: a coating having a dark color absorbing the majority of the incoming light.

Chemically modified: the addition of a molecular group to a solid surface, for example, to change its surface properties or its interaction with a fluid or a solid surface.

Diameter: a size of the particle for spherical microparticle. For non-spherical particles, diameter refers herein to the largest dimension of the microparticle along any axis.

Dye or Colorant: any substance that can cause a change in color when added to a fluid or solid.

Angular distribution of particles: the distribution of the angle of a plurality of microparticles relative to the direction of gravitation or acceleration.

Viscous drag: the forces acting on a solid object moving with respect to a surrounding fluid.

Maximum rotational speed: the highest rotational speed that a microparticle experiences during its alignment with gravitation or acceleration. For example, for spherical Janus microparticle, maximum rotational speed is typically reached when the Janus microparticle is misaligned by 90 degrees compared to the direction of the gravitational field or acceleration.

DETAILED DESCRIPTION OF PREFERRED EMBODIMENTS

Theoretical Considerations
1.1 Angular Rotational Speed

The main characteristic required for the rotation and alignment of a microparticle with gravitation or acceleration can be summarized as follow (see FIG. 1): the microparticle (1) has its center of gravity (2) located at a different position compared to its center of volume (3). This can be achieved if the microparticle has a non-uniform density, for example by making the microparticle from two different materials, or by coating a microparticle with a thin film having a different density, or by creating microparticles with a variable porosity. Under this condition, the gravitational or acceleration forces (6) (which are applied at the center of gravity) are generally not aligned with buoyancy forces (5) (which are applied at the center of volume). This leads to a torque (7) that rotates the microparticle until the center of gravity and center of volume are aligned with the acceleration field (4). The acceleration field (4) can be, for example, gravity. The microparticle is suspended in a fluid (8).

Figure 2:
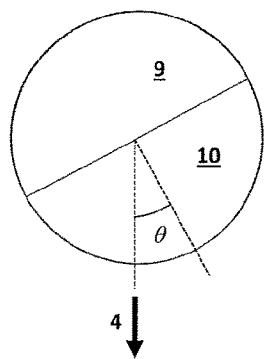
FIGS. 2A-2C illustrate the particle geometry of three examples used for theoretical modeling of rotational speed.
Figure 2:
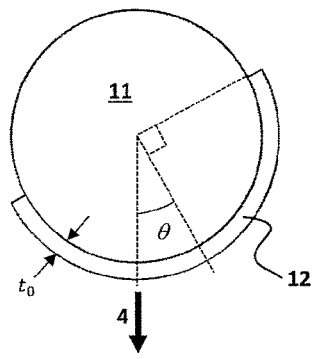
Figure 2:
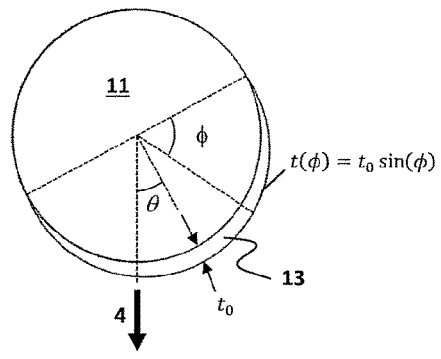
Figure 3:
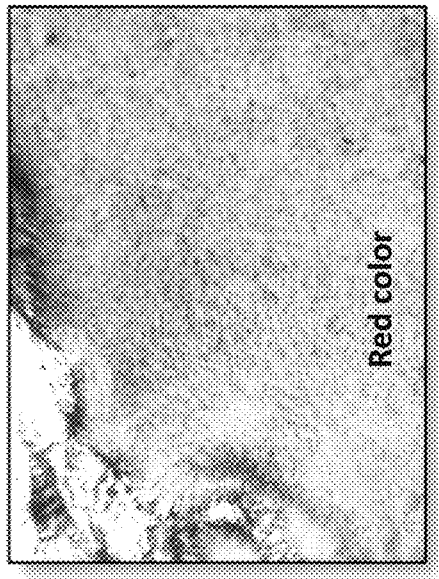
FIGS. 3A-3D illustrate dynamic macroscopic effects of one embodiment of gravitational Janus microparticles.
Figure 3:
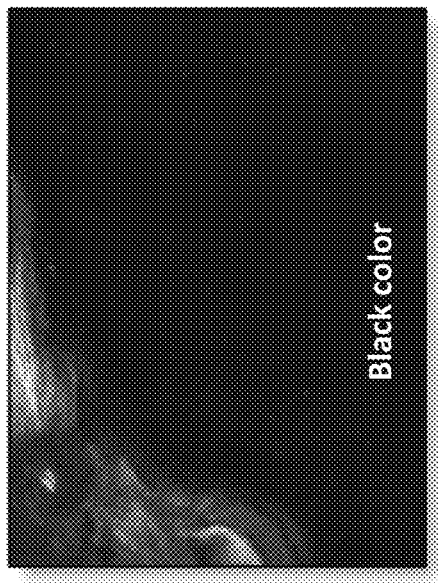
Figure 3:
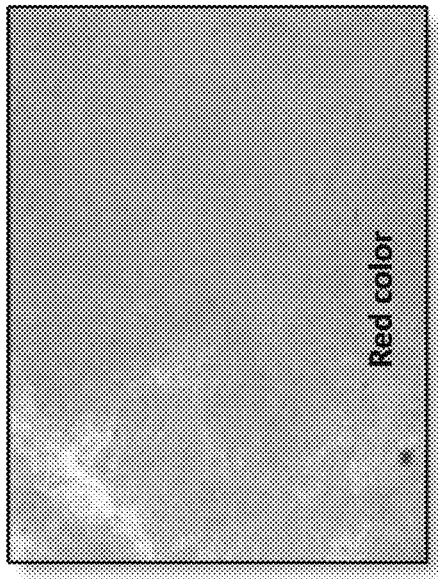
Figure 3:
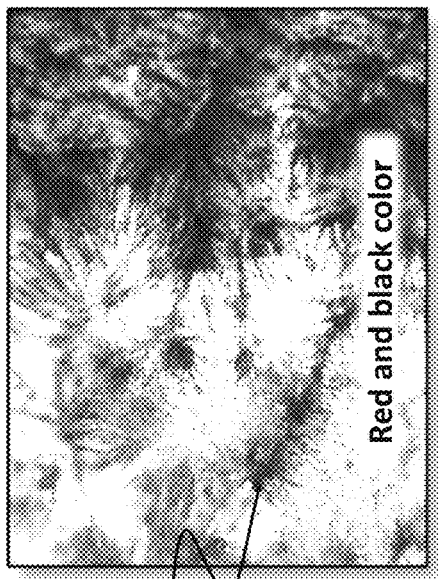

Theoretical modeling (assuming Stokes flow) provides estimates of rotational speeds for spherical or nearly-spherical particles. Examples of the angular rotational speed for three different geometries of spherical or nearly spherical gravitational Janus microparticles are provided below. The particle geometry for the three examples is shown in FIGS. 2A-2C.

Example 1

As a first example, for a Janus microparticle composed of two hemispheres with a different density (FIG. 2A), the rotational speed $\omega_{hemispheres}$ is calculated as $$\omega_{hemispheres} = \frac{ar(\rho_2 - \rho_1)}{32\eta}\sin(\theta), \quad \text{(eq. 1)}$$

where r is the radius of the sphere, a is the magnitude of the acceleration, $\eta$ is the viscosity of the surrounding fluid, $\rho_2$ and $\rho_1$ are the densities of the two hemispheres (9) and (10), respectively, and $\theta$ is the angle between the acceleration vector and a vector perpendicular to the plane of contact of the two hemispheres. This equation can be used to model Janus microparticles fabricated by a flow focussing technique, as discussed below. For example, for a 30 μm diameter particles with hemisphere densities of ~1.3 g/cm$^3$ and ~1.1 g/cm$^3$ placed in water ($\eta$=1 mPa*s=1 cP) in normal gravitation (a=g), the maximum angular velocity (i.e., at $\theta$=90°) is about 53 deg/s. If the diameter of the particle is reduced down to 3 μm, the rotational speed is reduced to about 5.3 deg/s.

Eq. (1) shows the general feature that the rotational speed increases with the size r of the microparticle; increases with an increase in density difference between the two hemispheres; decreases as the viscosity $\eta$ of the fluid increases, and decreases as the angle $\theta$ decreases. The latter implies that as the particle rotates from a maximum angle $\theta$ of 90 degrees, to a minimum of 0 degrees, the rotation of the particle slows down.

Example 2

As a second example, for a Janus microparticle composed of a spherical core (11) of radius r coated with a thin uniform half-shell (12) of thickness $t_0$ (see FIG. 2B), the rotational speed $\omega_{uniform-shell}$ can be calculated approximately as:

$$\omega_{uniform-shell} \cong \frac{at_0(\rho_{shell} - \rho_{sphere})}{8\eta}\sin(\theta), \text{ if } t_0 \ll \quad \text{(eq. 2)}$$

where, $\rho_{shell}$ and $\rho_{sphere}$ are respectively the densities of the half-shell and spherical core. A particle coated with a uniform half-shell can be obtained, for example, by conformal deposition technique such as electroless, electro-plating, chemical vapor deposition, atomic layer deposition, etc. For example, for a 3 μm polymer particle (ρ~1 g/cm³) coated with a 100 nm thick layer of a heavy metal with ρ~19 g/cm³ (tungsten, gold, etc.), placed in water (η~1 cP) in normal gravitation (a=g), the maximum angular velocity (i.e., at θ=90°) is about 125 deg/s. Note that, for this geometry, the rotational speed is independent of the particle size (as long as the coating thickness is unchanged and small compared to particle radius).

Eq. (2) shows the general feature that the rotational speed increases with the thickness $t_0$ of the coating; increases with an increase in density difference between the core and the coating; decreases as the viscosity η of the fluid increases, and decreases as the angle θ decreases. The latter implies that as the particle rotates from a maximum angle θ of 90 degrees, to a minimum of 0 degrees, the rotation of the particle slows down.

Example 3

As a third example, the microparticles can also be coated using a directional deposition technique such as e-beam evaporation or other physical vapor deposition techniques. For these techniques, the deposited thickness decreases as the substrate is tilted, giving rise to a non-uniform coating (13) on top of the Janus microparticles, as shown in FIG. 2C. It can be shown that the thickness of the coating on top of the microparticle can be modelled as $(\phi)=t_0 \sin(\phi)$, where $\phi$ is the angle of the substrate with the deposition direction and $t_0$ is the nominal thickness obtained for a substrate placed perpendicular to the deposition direction. For this Janus microparticle geometry, the rotational speed $\omega_{directional-shell}$ can be calculated approximately as:

$$\omega_{directional-shell} \cong \frac{at_0(\rho_{shell} - \rho_{sphere})}{12\eta} \sin(\theta), \text{ if } t_0 \ll r \quad \text{(eq. 3)}$$

For example, using the same parameters as the last example and a nominal thickness of 100 nm, a maximum angular velocity of about 85 deg/s is obtained. Eq. (3) shows the same general features as those of Eq. (2).

The equations and examples shown above provide guidelines to fabricate spherical Janus microparticles with appropriate characteristics to achieve rapid rotation with gravitation or acceleration. More importantly, the examples demonstrate that it is possible to fabricate Janus microparticles smaller than 5 μm in radius that can rotate and align with the gravitational field in only a few seconds if materials with large density differences are used and the liquid has a relatively low viscosity.

While the equations presented here are valid approximations only for spherical or nearly spherical particles, it is understood that other particle geometries can also lead to efficient rotation and alignment with gravitation or acceleration. The effect of particle shape is discussed further below.

1.2 Brownian Motion

Theoretical modeling allows for an estimate of a minimal particle size beyond which random Brownian motion dominates over convective gravitational (or acceleration) orientation.

For spherical particles, the rotational Brownian diffusion coefficient ($D_{Br-rot}$) is given by:

$$D_{Br-rot} = \frac{k_B T}{8\pi \eta r^3} \quad \text{(eq. 4)}$$

where r is the radius of the particle, T is the temperature, η is fluid viscosity, and $k_B$ is Boltzmann constant. The conditions under which random Brownian motion dominates over convective gravitational can be evaluated from the rotational Péclet number ($Pe_{rot}$) given by:

$$Pe_{rot} = \frac{|\omega_{max}|}{D_{Br-rot}} \quad \text{(eq. 5)}$$

For $Pe_{rot} \ll 1$, Brownian motion dominates, while for $Pe_{rot} \gg 1$, deterministic convective orientation dominates. For the geometry described in the example 3 described above, the rotational Péclet number thus becomes:

$$Pe_{rot} = \frac{2\pi a t_0 r^3 |\rho_{shell} - \rho_{sphere}|}{3 k_B T} \quad \text{(eq. 6)}$$

For example, using the 3 μm diameter particle described in example 3, a rotational Péclet number of about 30 is obtained at room-temperature, showing the predominance of convective gravitational alignment forces compared with random Brownian motion. However, if the size of the same particle is decreased to 1 μm diameter, the rotational Péclet number decreases to about 1, indicating that random Brownian motion becomes significant. Therefore, as particle size decreases, the random motion induced by Brownian motion leads to large angular deviation that broadens the angular distribution of the particles.

The theoretical analysis shown herein unexpectedly demonstrates that, by optimizing their physical characteristics, it is possible to fabricate Janus microparticles as small as about 2 μm showing both rapid gravitational alignment and low Brownian angular dispersion.

1.3 Shape of the Janus Microparticles

While nearly-spherical microparticles have been considered in the theoretical analysis, it should be understood that gravitational Janus microparticles with arbitrary shapes can also be oriented in a similar manner by gravitation or acceleration when the center of gravity is located at a different position compared with their center of volume (see FIG. 1). However, in general, the rotational speed of non-spherical particles with gravitation or acceleration cannot be determined analytically and more complex numerical simulations have to be performed to evaluate the rotational speed of such particles.

The shape of the microparticles can also impede or prevent its rotation and alignment with gravitation or acceleration in the presence of solid walls. Indeed, as the average density of the Janus microparticles is in general different than the density of the surrounding fluid, sedimentation/flotation and rotation can both occur simultaneously. For applications where the fluidic chamber containing the microparticles has a limited size, rotation of the particles can be slower than the time required for sedimentation, forcing the particles to terminate rotation and gravitational alignment in contact with a solid wall. It has been observed experimentally that spherical or nearly-spherical particles can rotate and align with gravitation or acceleration even when in contact with a wall, as long as wall-particle interaction forces are low. For non-spherical particles, the normal force arising from the contact with the wall can create an additional torque that disturbs microparticle alignment with gravitation/acceleration.

Several types of geometries can favor rotation and alignment of the gravitational Janus microparticle in contact with a wall. In general, rotation is possible in contact with a solid wall if the additional torque caused by the normal force is smaller than the gravitational torque caused by the particle non-uniform density. One example of particle geometry includes Janus microparticles that are axially symmetric (or nearly axially symmetric) along at least one axis and for which the center of mass is located away from this axis. For example, cylindrically-shaped Janus microparticles with a center of mass located away from the cylindrical axis offers favorable conditions to rotate and align with gravitation even when placed in contact with a solid wall. Another type of geometry favorable to the alignment of the sedimented particles includes Janus microparticles containing materials both denser and lighter than the surrounding fluid. In this case, the upward buoyant force exceeds the gravitational force locally on the particles, which can create an additional torque that favors alignment of non-spherical particles despite the normal force arising from the contact with a solid wall.

1.4 Sedimentation

To minimize the effect of sidewalls on the rotation and gravitational alignment, the Janus microparticles can be made neutrally buoyant to eliminate sedimentation or flotation. On the other hand, Janus microparticles optimized for rapid gravitational alignment typically have an average density higher than the density of many standard fluids. Indeed, a dense material can be integrated to improve the alignment of the Janus microparticles, as angular rotational speed increases with density differences (see equations 1 to 3). For example, the average density of a 5 µm spherical polymer particle ($\rho$~1 g/cm$^3$) coated with a uniform half-shell of 100 nm of tungsten ($\Sigma$~19 g/cm$^3$) is of about 2 g/cm$^3$. If required, liquids with a high density can be used to obtain neutrally buoyant gravitational Janus microparticles. Favorable high density liquids include: perfluorocarbon fluids, perfluoropolyether fluids, ethylene dibromide, methylene dibromide, sodium polytungstate, methylene iodide and other heavy liquids known in the art having a low viscosity, or mixtures of a high density liquid with other solvents.

In the presence of significant sedimentation, the viscous forces of the fluid circulating around the microparticles can also create significant torque that can affect particle orientation. For gravitational Janus microparticles with a non-uniform density, the gravitational torque leads to an alignment force that persists after the particles have sedimented on a solid wall. Thus, as long as the particles can rotate in contact with a solid wall, substantial collective alignment is eventually achieved, even in the presence of complex flow profiles arising from multi-body interactions during sedimentation.

FIGS. 3A-3D present an example of the complex flow profiles arising during the sedimentation of nearly-spherical gravitational 5-µm diameter Janus microparticles that have a surface portion that is red, and another surface portion that is black. A fabrication procedure is described below. The particles are designed to have the black side align in the direction of gravitation. The particles are dispersed in an aqueous solution and left to sediment and align in a transparent container.

FIGS. 3A-3D show sequential images illustrating the dynamic contrast changes that occur after the container is flipped. The direction of observation is from above the container. FIGS. 3A-3D were obtained by extracting only the red component of color images to better highlight color changes resulting from the particle rotation in a grayscale image. Following this conversion, red color associated with the red side of the particle appears as white or pale gray and the darker colors associated with the black side of the particles appears as black or dark gray.

Just after flipping of the fluidic container (FIG. 3A), a black color is observed. Three seconds after flipping (FIG. 3B), the color quickly reverts back to a red color (lighter shading in FIG. 3B) following gravitational-induced rotation and alignment of the microparticles. Six seconds after flipping, (FIG. 3C), the particles are then found to group in dendritic-like filaments (301) during sedimentation, which significantly perturbs the orientation of the microparticles (thus, both red and black colors are observed). Formation of such complex patterns is caused by the complex flow profiles arising from multi-body interactions during sedimentation. After 20 s (FIG. 3D), the microparticles have reached the bottom wall of the container and sedimentation ends. Only red color is observed after sedimentation, confirming the successful gravitational-induced alignment of the particles on the bottom wall of the container.

The complex flow profiles arising from multi-body interactions during sedimentation highlights the need to either (i) make the gravitational Janus microparticle neutrally buoyant to minimize the effect of sedimentation on particle orientation or (ii) to design the particles to permit rotation and gravitational alignment on a solid wall after sedimentation.

1.5 Summary

In summary, successful rotation and alignment of a collection of Janus microparticles by gravitation or acceleration is a complex interplay between: (i) the non-uniform density of the particles, (ii) Brownian motion, (iii) particle shape and (iv) sedimentation. Other parameters such as fluid viscosity, sidewall interactions, particle-to-particle interactions, etc. should also be optimized. Successful generation of macroscopic effects from the rotation of the particles also depends on other parameters such as particle concentration and packing density, reflectivity of the particles, type of illumination, etc.

Experimental Results

Various different techniques known in the art can be used to fabricate Janus microparticles having the characteristics required for gravitational alignment. Two possible techniques are discussed below.

2.1. Microfluidic Flow Focussing

Janus microparticles can be fabricated using a microfluidic-based flow focussing technique (see FIG. 4A). The particles were obtained by focussing, inside microfluidic channels (401), a flow of mineral oil (402) with a laminar flow of (i) photocurable polyethylene glycol diacrylate (PEGDA) doped with iron-oxide-silica nanoparticles and (ii) photocurable ethoxylated trimethylolpropane triacrylate (ETPTA). Under appropriate conditions, microscopic droplets (403) composed of ETPTA and PEGDA flowing in oil are obtained, which can then be processed to generate ETPTA/PEGDA Janus microparticles (404) of about 30 µm via photo-polymerisation (see FIG. 4B). The nanoparticle doping of the PEGDA gives rise both to a density difference (1.3 g/cm$^3$ for the PEGDA vs 1.1 g/cm$^3$ for the ETPTA) as well as a visible color difference and different magnetic properties. As shown in the side view images of FIG. 4C (i.e. gravitation in pointing downward), the microparticles were observed to rotate and align with the gravitational field at about 15 deg/s when placed in a liquid having a viscosity of about 4 cP. The observed rotational speeds were also comparable with theoretical predictions by modelling the particles as two hemispheres having a different density (see FIG. 2a and eq. 1).

2.2 Coating of Self-Assembled Colloidal Crystals

The fabrication of gravitational Janus microparticles can also be achieved by coating self-assembled colloidal crystals. The developed fabrication process starts from commercially-available micron size particles. The particles are first dispersed in an aqueous solution (or a solvent), deposited on a substrate and left to dry. As known in the art, the drying process can create a self-assembled monolayer of particles on the substrate, which is referred to as a colloidal crystal. After drying, the particles are coated with a thin film using a deposition process known in the art. As an example, deposition techniques having a non-conformal preferred direction for the deposited material can be used to coat only the top of the particles. Non conformal deposition techniques include physical vapor deposition process, for example, e-beam evaporation. The high packing density of the particles on the substrate then ensures that the coating is made preferentially on one side of the particles, thus giving rise to particles with the non-uniform density required by the disclosed invention. Alternatively, the non-uniformity of the coating can be increased by changing the angle of the substrate during the deposition of the coating on top of the colloidal crystal.

Many types of coatings materials can be used to generate the non-uniform density profile. In one embodiment, the coating can consist of a 10 nm to 500 nm thick film having a high density. Many materials are also suitable, for example high-density metals such as gold or tungsten. Other types of deposition techniques can also be implemented for the deposition of the coating. For example, soft lithography approaches, where a soft stamp is brought in contact with the deposited particles, can be used to deposit a layer of catalyst material on top of the particles. The particles are then exposed to electroless plating, giving rise to the deposition of a relatively uniform layer of controlled thickness on top of the particles.

After deposition of the coating, the microparticles are dispersed either in a solvent or in the final liquid by sonication. Particle dispersion can be improved by etching slightly the deposited colloidal crystal of particles before the deposition of the coating. For example, polystyrene particles were etched in a reactive ion etching system using oxygen plasma.

Gravitational Janus microparticles have been successfully dispersed in many solvents including aqueous solutions, oils, organic solvents, perfluorocarbons, hydrocarbons, perfluoropolyethers, thermoset pre-polymers, isoparaffinic fluids, UV curable lacquers, etc. As an example, liquids with a low evaporation, low vapor pressure, low viscosity, low toxicity and large temperature window can be used. As discussed above, liquids providing neutral buoyancy to the particles are also of interest. The liquid can also contain surfactants and/or dispersion agents to favor particle dispersion and minimize interaction of the particles with solid walls (for example: Span 80, sodium dodecyl sulfate, polysorbate detergents such as Tween20, poloxamer such as Pluronics, synthetic perfluoropolyether (PFPE) lubricants such as Krytox, Fomblin, etc.). To enhance particle dispersion in a particular liquid, the surface of the particles can also be chemically modified by immobilizing specific moiety that renders the typically amphiphilic Janus particle hydrophilic, hydrophobic, superhydrophobic or oleophilic. For example, perfluorohexadecanethiol can be immobilized on the gold surface of the microparticle to enhance its hydrophobicity and allow dispersion in PFPE fluids. As a final optional step, the particle concentration can be adjusted by centrifugation or other techniques known in the art.

Figure 5:
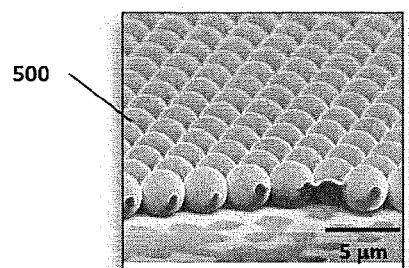
FIGS. 5A-5C illustrate dynamic macroscopic effects of a third embodiment of gravitational Janus microparticles.
Figure 5:
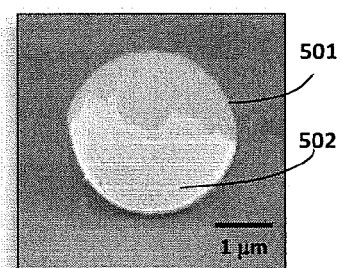
Figure 5:
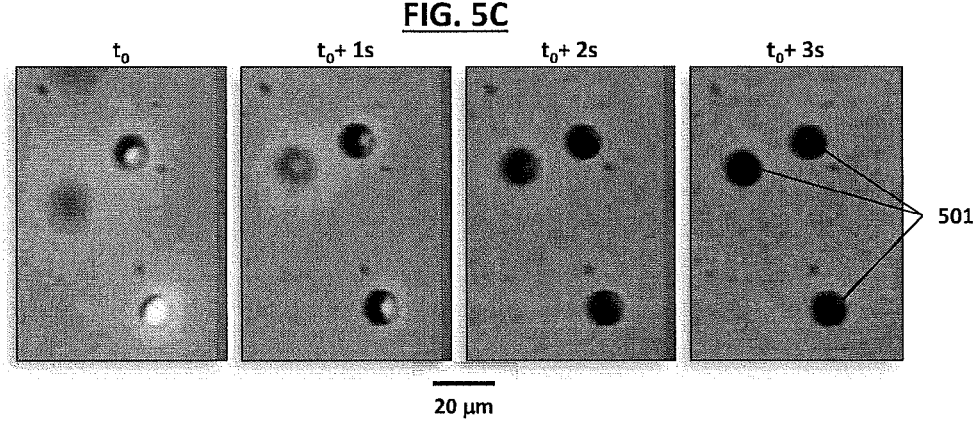

FIG. 5A show a scanning electron microscopy (SEM) micrographs of a colloidal crystal (500) of 3 μm diameter microparticles coated with 100 nm thick gold coating. FIG. 5B illustrates a gravitational Janus microparticle (501) after dispersion where the 100 nm thick gold coating (502) is visible due to its brighter contrast. FIG. 5C, shows a sequence of fluorescence images of gravitational Janus microparticles (501) fabricated by coating self-assembled colloidal crystals and dispersed in an aqueous solution after sonication. In this example, the Janus microparticles consists of 10 μm polystyrene particles doped with a fluorescent dye that have been coated with a layer of gold ($t_0$=100 nm) and nickel ($t_0$=20 nm) by e-beam evaporation. The metal coating masks the fluorescent dye on a portion of the particles, thus providing visible indication of their orientation. In FIG. 5C, the particles were imaged from the bottom and gravitational alignment is thus achieved when only the black side of the particle is visible. Rotation and gravitational alignment is seen to take place in only few seconds. The maximum rotational speed of the particles was found to be about 60 to 70 deg/s, which is comparable to the theoretical prediction of 85 deg/s given by equation 3. Note that, for the images of FIG. 5C, the particles were deposited on the bottom wall of the fluidic container, thus demonstrating the possibility to achieve alignment even after sedimentation for nearly spherical gravitational Janus microparticles fabricated from self-assembled colloidal crystals. The nearby presence of a bottom wall of the fluidic container can also explain the lower rotational speed measured compared to the theoretical predictions (because of the no-slip boundary condition caused by the solid wall).

The fabrication technique based on coating of self-assembled colloidal crystals can produce gravitational Janus microparticles on a large scale. Commercially available polymer microparticles can be deposited and dried on a polymer carrier. The various coatings required for the functionality of the particles (density profile, color, functionalization, etc.) are then be deposited using continuous systems based, for example, on inline physical vapor deposition systems (etc.). Particle dispersion can then be obtained by large scale sonication.

2.3 Optimization of Macroscopic Effects

In one embodiment, a collection of gravitational Janus microparticles can create a macroscopic effect following their rotation and alignment. For example, this effect can be visible to the unaided human eye. To create this visible effect, the Janus microparticles must not only have the characteristics required to rotate and align with gravitation or acceleration, but must also include one or more angular dependant characteristics generating a visual contrast—for example two or more different colors on the surface of the microparticle.

A visual contrast can be obtained by fabricating gravitational Janus microparticles starting from commercially available spherical polystyrene particles doped with a conventional dye (for example purchased from Microparticles Gmbh). A metallic coating deposited on the colloidal crystal masks the dye on a portion of the particle, giving rise to the targeted visual contrast. As an example, FIG. 6A shows a dispersion of gravitational Janus microparticles made from commercially available 5 μm blue polystyrene particles that were partially coated with a gold layer and subsequently dispersed in an aqueous solution. The cuvette (601) containing the Janus particle solution is placed above a mirror (602), providing the possibility to image the solution from top and bottom simultaneously. FIGS. 6A-6D were obtained by extracting only the red component of color images to better highlight color change resulting from the particle rotation in a grayscale image.

Following this conversion, golden color associated with the gold-coated side of the particle appears as white or pale gray and the blue colors associated with the blue side of the particles appears as dark gray. FIG. 6A shows that the golden color of the gold coating is aligned with gravitation, while the blue color of the uncoated part of the particle is seen only from top. Just after mixing the fluid in the cuvette (FIG. 6B), both blue and gold colors are seen from both orientations. The two orientation dependant colors reappear about five seconds after mixing (FIG. 6C). Note that similar tests were also performed using red colored polystyrene particles coated with a gold layer. The resulting macroscopic contrast was found to be low because of the relatively low color difference between the gold layer and the red color of the particles.

Other techniques can be also used to create the angular dependant characteristics generating a visual contrast. For example, a first color can be obtained by applying a thin uniform dye on the entire surface of the particles by immersion or other techniques. One or more dyes can also be applied only in a portion of the particle using a soft stamp brought in contact with the colloidal particle crystal. In another embodiment, refraction and lensing effects obtained from transparent particles can be used to enhance the visual contrast created during the rotation of the particles. Also, diffraction gratings or other optically variable coatings may also be applied on a section of the particles to create angular dependant visible effects. Finally, various types (or embodiments) of gravitational Janus microparticles can be dispersed simultaneously in a liquid to give rise to a visible effect where the different rotational speed of the particles produces a sequence of multiple effects following a perturbation.

When gravitational Janus microparticles are dispersed in a solution, a much better visual contrast is obtained for reflected light than for transmitted light. Light transmitted through the dispersion is not affected significantly by the orientation of the particles. Improved contrast can therefore be obtained by minimizing transmitted light, for example by placing the microparticle solution above a dark background, by increasing particle concentration or by creating a densely pack monolayer of particles. For example, following sedimentation, the particles can naturally form a relatively dense monolayer; significantly reducing the amount of transmitted light and thus improving markedly the visible contrast (for example see FIGS. 7A-C).

Light reflecting on multiple particles can also decrease the visible contrast generated by the rotation of the particles. For example, when reflective metallic coatings are used on the particles, the color of other nearby particles can be reflected by the coating, reducing the contrast generated by the collective alignment of the particles. An example of a coating that minimizes reflection of the light on multiple particles is as follows: Cr (2 nm)-Au (100 nm)-Cr (2 nm)-$SiO_2$ (80 nm)-Cr (10 nm)-$SiO_2$ (80 nm). The 2 nm thick Cr films are adhesion layers, the Au layer creates the high density coating required to ensure fast rotation, and the $SiO_2$—Cr—$SiO_2$ layers creates the anti-reflective dark coating.

Figure 7A:
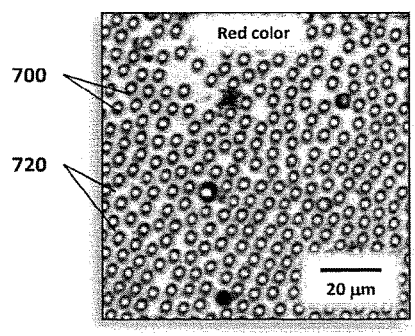
FIGS. 7A-7G illustrate dynamic macroscopic effects of a fifth embodiment of gravitational Janus microparticles.
Figure 7B:
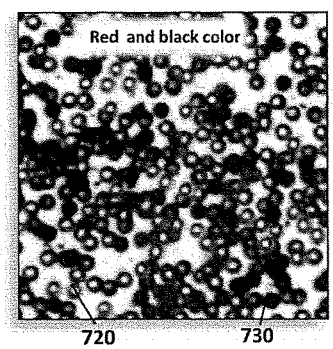
Figure 7C:
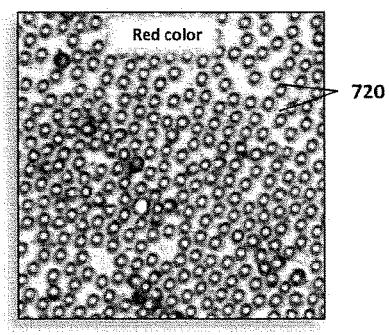

Examples of red polystyrene particles coated with the aforementioned gravitational anti-reflective coating are shown in FIGS. 7A-7G. FIGS. 7A-7G were obtained by extracting only the red component of color images to better highlight color change resulting from the particle rotation in a grayscale image. Following this conversion, red color associated with the red side of the particle appears as white or pale gray and the darker colors associated with the side of the particles coated with the anti-reflective coating appears as black or dark gray. FIG. 7A-C show microscopic sequential images of the developed gravitational Janus microparticles (701) both before and after a local fluid perturbation. The particles are sedimented on a solid wall and are imaged from top. Before the local fluid perturbation (FIG. 7A), almost all of the particles are aligned such that only the red color (720) is visible, hiding the dark anti-reflective gravitational coating. FIG. 7B shows the particles just after a local perturbation obtained by mixing the liquid. Both the dark (730) and the red (720) sides of the particles are visible. FIG. 7c show that the particles are rotating back to their original orientation five seconds after the perturbation (i.e., only the red color is visible), thus demonstrating the capabilities of the Janus microparticles to collectively align with gravitation when sedimented on a solid wall.

Figure 7D:
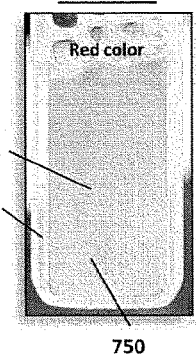
Figure 7E:
Figure 7F:
Figure 7G:
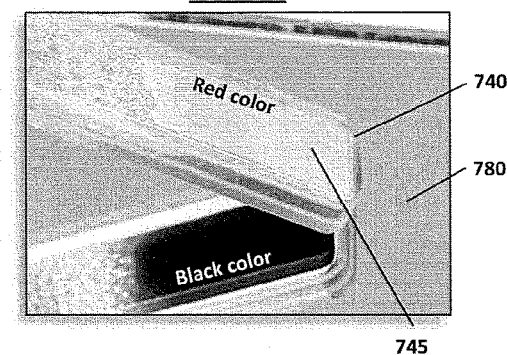

FIGS. 7D-7F show the macroscopic contrast visible following a local perturbation for solution (745) containing approximately 1% volume concentration of the developed red-black gravitational Janus microparticles. In FIG. 7D, the solution shows a macroscopic red color (750) when it is left in a glass cuvette (740) without perturbation for a few seconds. Macroscopic regions of black color (760) are seen to appear in the solution after a local fluidic perturbation (FIG. 7E), showing that the rapid liquid displacements caused similar amount of particle rotation across macroscopic regions. FIG. 7F shows the visible contrast of the solution about 2 s after the end of the perturbation. The regions of black color are then seen to revert back the initial red color of the solution in a few seconds. The macroscopic color variations induced by the rotation of the particles may be used to characterize vorticity in a fluid, as discussed below. FIG. 7G shows the macroscopic contrast obtained between the two observation orientations when the solution containing the gravitational Janus microparticles is placed above a mirror (770) in a glass cuvette (780). High contrast is visible under normal ambient lightning conditions despite the relatively low particle concentration of the solution.

Figure 8:
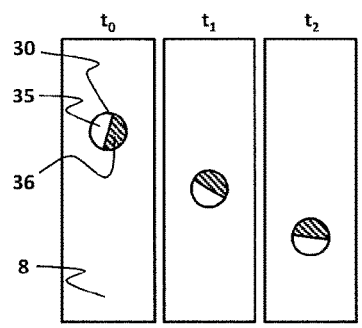
FIGS. 8A-8C illustrate dynamics of different embodiments of gravitational Janus microparticles.
Figure 8:
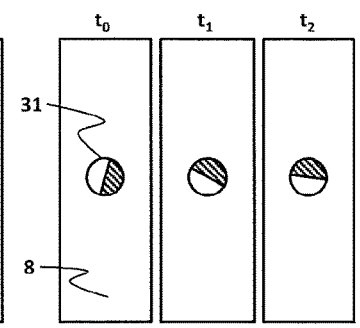
Figure 8:
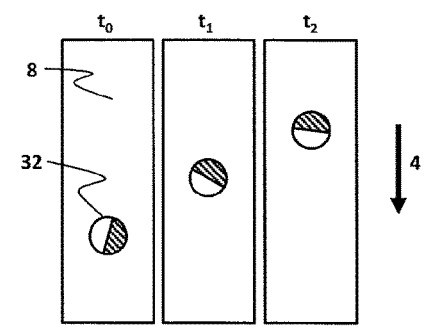

FIGS. 8A-8C illustrate the dynamics of three different situations. In all three, the time sequence is $t_2 > t_1 > t_0$. Furthermore, the equilibrium position of the Janus microparticle is such that one portion of the microparticle (30), denoted by (36), aligns atop the other portion, denoted by (35).

In FIG. 8A, the average density of the Janus microparticle (30) is greater than the density of the fluid (8), and thus sediments (falls) with time, as it rotates to align with the gravitational field (4), until the Janus microparticle reaches a substantial rotational equilibrium (at $t=t_2$). In FIG. 8B, the average density of the Janus microparticle (31) is substantially equal to the density of the fluid (8), and thus the microparticle (31) neither sinks nor floats significantly. With time, it rotates to align with the gravitational field (4), until equilibrium is reached at $t=t_2$. In FIG. 8C, the average density of the Janus microparticle (32) is less than the density of the fluid (8), and thus floats (rises) with time, as it rotates to align with the gravitational field (4), until the Janus microparticle reaches a substantial rotational equilibrium (at $t=t_2$).

In addition to use of an anti-reflective dark coating, other approaches can also be used to minimize the reflection on multiple microparticles. For example, the microparticles can be coated with materials having a low reflectivity such as carbon or germanium. Alternatively, a dark dye may be applied on a partial surface of the particles using a soft stamp brought in contact with the colloidal crystal of particles. Specular reflections can also be reduced by increasing the roughness of the particles, for example by etching techniques such as reactive ion etching.

Applications of Gravitational Janus Microparticles

Gravitational Janus microparticles can be used for applications in the field of document security and anti-counterfeiting. For example, a security device (containing gravitational Janus microparticles and a fluid) can be integrated onto a substrate of a document. The security device can consist of one or more chambers or channels filled with fluid and gravitational Janus microparticles. The chambers and channels can be designed to create specific drawings or signatures. Furthermore, the chambers and channels may be interconnected or may consist of a plurality of independent sections. In addition, one or more different types of gravitational Janus microparticles can be integrated into the channels and chambers, which can then be filled with one or more fluids, for example, to create a variety of dynamic effects.

For example, when the document is flipped, the alignment of the particles (with gravitation) is temporarily disrupted. Subsequently, the gravitational force rotates back the gravitational Janus microparticles towards alignment, thus giving rise to the dynamic effects discussed previously. The rotational speed of the particles can be adjusted to create effects that persist for some time after the manipulation of the document, thus giving rise to a unique signature that would be very difficult to copy of emulate. In one embodiment, the rotation of the gravitational Janus microparticles gives rise to a color or contrast change observable directly with an unaided human eye. In yet another embodiment, the substrate is at least partially transparent to enable the observation of the device on each side of the document. The gravitational Janus microparticles may also act as lenses that deviate light so as to change, reveal or magnify a static printed device. Alternatively, complex devices may be patterned directly on the gravitational Janus microparticles to enhance to effect caused by their rotation or displacement. The light deviation caused by the gravitational Janus microparticles can then be used to magnify a small section of the devices printed on the gravitational Janus microparticles, potentially giving rise to complex dynamic effects occurring both with the particle rotation and angle of observation. The gravitational Janus microparticles may also contain either conventional dyes, or even photochromic, thermochromic, or electrochromic dyes to enhance or change the effect of the security device. In addition, the interaction of gravitational Janus microparticles with the sidewalls of the device can be tuned to create various effects. For example, this interaction might be such that only strong acceleration, (e.g. by shaking vigorously) can dislodge the microscopic gravitational Janus microparticles from the sidewall and allow them to rotate and eventually realign with gravitation, so as to create the dynamic effect of the security device.

In addition, gravitational Janus microparticles find application in the measurement of acceleration magnitude or orientation. Properly designed gravitational Janus microparticles align with acceleration and provide a direct feedback (either visual or machine readable) about acceleration direction. Such microparticles can be designed to function in a manner similar to a gyroscope, but no external power sources are required to maintain its operation. Information about the acceleration magnitude can also be obtained by monitoring the angular dispersion of the gravitational Janus microparticles caused by the interplay of Brownian dispersive forces and acceleration. For example, a device may integrate gravitational Janus microparticles of various sizes, each identified with a different color. The various types of particles are then gradually brought into proper alignment at different acceleration magnitudes. Thus, passive devices displaying a color or contrast that is function of both the direction and magnitude of acceleration can be fabricated.

Gravitational Janus microparticles can be used in biomedical applications. More specifically, the surface or a surface portion of the gravitational Janus microparticles can be functionalized to favor attachment of biomolecules such as DNA or proteins using techniques known in the art. For example, a hemisphere of the Janus particle that is coated with gold can be functionalized using thiol-based surface chemistry to attach various biomolecules, including DNA, aptamers, functional thiolated PEGs and other linkers for immobilization of antibodies, peptides, antigens, and small molecules. Herein, when the particles are placed in contact with probe biomolecules immobilized on a solid surface, the presence of complementary target biomolecules on the surface of the Janus microparticles increases its interaction with the solid surface, eventually preventing rotation and alignment with gravitation. Simple colorimetric tests based on the developed gravitational Janus microparticles where the presence of target biomolecule in an unknown sample is then for example revealed by the amount of color change observed when flipping the devices.

As another example, a surface portion of the gravitational Janus microparticles can be functionalized with one or more specific probe biomolecules using techniques known in the art. When the particles are exposed to the complementary labeled target biomolecule, attachment of a labeled molecule occurs only on this surface portion of the particles. The predictable gravitational alignment of the particles is then used to improve the detected signal for a detector, as the system may then be designed to avoid having the particles masking part of the signal coming from the labelled target biomolecules.

As a third example of application, gravitational Janus microparticles may be used to monitor specific types of fluid displacements. Microparticles have been widely used to monitor liquid displacements using techniques such as particle image velocimetry. In these techniques, it is however difficult to track precisely in three dimensions the local liquid displacements without the use of complex equipments. Also, some types of liquid displacement, such as vorticity, are difficult to measure with a high spatial resolution using particle image velocimetry. As demonstrated in FIGS. 7D-7F, color changes in macroscopic regions can be observed directly by an unaided human eye during the mixing of a solution containing the gravitational Janus microparticles. During rapid liquid displacement, the Janus microparticles rotate out of alignment with the gravitational field, depending on the amount of local liquid vorticity, thus providing direct visual or machine readable information about this specific type of liquid displacement. The developed gravitational Janus microparticles aid in improving the accuracy of vorticity measurement.

It will be appreciated by persons skilled in the art that the foregoing disclosure constitutes a description of specific embodiments showing how the gravitational Janus microparticles may be applied and put into use. These embodiments are only exemplary and are not meant to limit the disclosure to what has been particularly shown and described herein above. A variety of modifications and variations are possible in light of the above teachings without departing from the scope of the present disclosure. The gravitational Janus microparticles and related compositions are further described and defined in the claims which now follow.

We claim:

1. A Janus microparticle having, a center-of-mass, a center-of-volume, and a non-uniform density, wherein:
   the center-of-mass and the center-of-volume are distinct; and
   when suspended in a fluid:
      the Janus microparticle substantially aligns with the gravitational field, such that the Janus microparticle is in substantial rotation equilibrium; and
      after perturbation from substantial rotational equilibrium, the Janus microparticle reversibly rotates to return to substantial rotational equilibrium,
      wherein rotational Brownian motion is negligible compared to convection forces due to gravitation; and the Janus microparticles substantially align with the gravitation field.

2. The Janus microparticle in accordance with claim 1, wherein the perturbation is caused by an external force selected from viscous drag, mechanical, electrical, electrostatic, dielectrophoretic, magnetic and any combination thereof.

3. The Janus microparticle in accordance with claim 1, wherein the Janus microparticle rotates with a maximum rotational velocity between 5 deg/s and 400 deg/s when exposed to gravitational acceleration of 9.8 m/s$^2$ and the fluid has a viscosity between 1 cP and 20 cP.

4. The Janus microparticle in accordance with claim 1, wherein the reversible rotation and/or alignment occurs between 0.01 s and 100 when the Janus microparticle is exposed to gravitational acceleration of 9.8 m/s$^2$ and the fluid has a viscosity between 1 cP and 20 cP.

5. A Janus microparticle having, a center-of-mass, a center-of-volume, and a non-uniform density, wherein:
   the center-of-mass and the center-of-volume are distinct; and
   when suspended in a fluid:
      the Janus microparticle substantially aligns with the direction of an acceleration such that the Janus microparticle is in substantial rotation equilibrium; and
      after perturbation from substantial rotational equilibrium, the Janus microparticle reversibly rotates to return to substantial rotational equilibrium,
      wherein: random rotational Brownian motion exceeds convection forces due to gravitation; the Janus microparticles substantially align with the direction of the acceleration; and the acceleration has a magnitude greater than 9.8 m/s$^2$.

6. The Janus microparticle in accordance with claim 1, comprising at least two portions, each having distinct physical and/or chemical characteristics, wherein at least one portion provides a detectable effect following rotation and alignment of the microparticle.

7. The Janus microparticle in accordance with claim 6, wherein the macroscopic detectable collective effect is observable by an unaided human eye.

8. The Janus microparticle in accordance with claim 1 having a size of between 0.1 micron and 100 microns.

9. The Janus microparticle in accordance with claim 1 comprising a material with a non-uniform porosity.

10. The Janus microparticle in accordance with claim 1 comprising at least two materials, each material having a different density.

11. The Janus microparticle in accordance with claim 10 comprising: i) an inner core; and ii) a coating on a surface portion of the Janus particle, wherein the inner core has a density distinct from a density of the coating.

12. The Janus microparticle in accordance with claim 11, wherein the inner core has a size from 0.1 to 100 microns, and the coating has a thickness of from 10 nm to 500 nm, while having a maximum value of 20% of the size of the inner core.

13. The Janus microparticle in accordance with claim 1 for use in security devices, authentication devices, a biomedical application, measurement of acceleration, measurement of orientation, or fluid displacement.

14. A plurality of Janus microparticles, each microparticle defined in accordance with claim 1, wherein the plurality includes a distribution of Janus microparticles having different rotational speeds that produce a sequence of multiple macroscopic effects following the perturbation.

15. A composition comprising: a plurality of Janus particles; and a fluid; wherein each of the Janus particles:
   has a center-of-mass distinct from a center-of-volume;
   substantially aligns with a gravitational field, such that the Janus microparticles are in substantial rotation equilibrium; and
   after perturbation from substantial rotational equilibrium, reversibly rotates and/or substantially realigns to substantial rotational equilibrium,
   wherein rotational Brownian motion is negligible compared to convection forces due to gravitation; and the Janus microparticles substantially align with the gravitation field.

16. The composition in accordance with claim 15, wherein the perturbation is caused by an external force selected from viscous drag, mechanical, electrical, electrostatic, dielectrophoretic, magnetic and any combination thereof.

17. The composition in accordance with claim 15 wherein the Janus microparticle has an average density greater than the density of the fluid; and a part of the Janus microparticle has a density less than the density of the fluid.

18. The composition in accordance with claim 15, wherein the Janus microparticle has an average density less than the density of the fluid; and at least a part of the Janus microparticle has a density greater than the density of the fluid.

19. The composition in accordance with claim 15, wherein an average density of the Janus microparticle is similar to a density of the fluid.

20. The composition in accordance with claim 19 wherein the fluid is selected from aqueous solutions, fluorinated oils, hydrofluoroether, glycol derivatives, ionic liquids, silicone oils, perfluorocarbon fluids, perfluoropolyether fluids, ethylene dibromide, methylene dibromide, sodium polytungstate, methylene iodide and mixtures thereof.

21. The composition in accordance with claim 15 wherein the fluid includes a surfactant, a stabilizer or a dispersion agent.

22. The composition in accordance with claim 21, wherein the surfactant is selected from the group consisting of poloxamer, polysorbate detergent, sodium dodecyl sulfate, sorbitan oleate, perfluoropolyether lubricant and any combination thereof.

23. A composition comprising: a plurality of Janus particles; and a fluid; wherein each of the Janus particles:

has a center-of-mass distinct from a center-of-volume;
substantially aligns with the direction of an acceleration, such that the Janus microparticles are in substantial rotation equilibrium; and
after perturbation from substantial rotational equilibrium, reversibly rotates and/or substantially realigns to substantial rotational equilibrium,
wherein: random rotational Brownian motion exceeds convection forces due to gravitation; the Janus microparticles substantially align with the direction of the acceleration; and the acceleration has a magnitude greater than 9.8 m/s$^2$.

\* \* \* \* \*

UNITED STATES PATENT AND TRADEMARK OFFICE
CERTIFICATE OF CORRECTION

PATENT NO. : 10,551,610 B2
APPLICATION NO. : 15/539508
DATED : February 4, 2020
INVENTOR(S) : Daniel Brassard et al.

Page 1 of 1

It is certified that error appears in the above-identified patent and that said Letters Patent is hereby corrected as shown below:

On the Title Page

Item (72) Inventors, the fifth name inventor "Charles D. Macpherson" should read -- Charles D. MacPherson --.

Signed and Sealed this
Fifth Day of January, 2021

Andrei Iancu
*Director of the United States Patent and Trademark Office*